US012679993B2

(12) United States Patent
Sanders et al.

(10) Patent No.: US 12,679,993 B2
(45) Date of Patent: Jul. 14, 2026

(54) PHOTOHARDENABLE COMPOSITIONS AND METHODS FOR FORMING AN OBJECT IN A VOLUME OF A PHOTOHARDENABLE COMPOSITION

(71) Applicant: QUADRATIC 3D, INC., Charlestown, MA (US)

(72) Inventors: Samuel N. Sanders, Arlington, MA (US); Emily M. Arndt, Arkon, OH (US)

(73) Assignee: QUADRATIC 3D, INC., Charlestown, MA (US)

( * ) Notice: Subject to any disclaimer, the term of this patent is extended or adjusted under 35 U.S.C. 154(b) by 173 days.

(21) Appl. No.: 18/414,277

(22) Filed: Jan. 16, 2024

(65) Prior Publication Data

US 2024/0166912 A1 May 23, 2024

Related U.S. Application Data

(63) Continuation of application No. PCT/US2022/037491, filed on Jul. 18, 2022.

(60) Provisional application No. 63/239,345, filed on Aug. 31, 2021, provisional application No. 63/228,356, filed on Aug. 2, 2021, provisional application No. 63/226,594, filed on Jul. 28, 2021, provisional application No. 63/226,605, filed on Jul. 28, 2021, provisional application No. 63/223,112, filed on Jul. 19, 2021.

(51) Int. Cl.

| | |
|---|---|
| ***C09D 133/14*** | (2006.01) |
| ***B29C 64/129*** | (2017.01) |
| ***B29C 64/282*** | (2017.01) |
| ***B29K 33/00*** | (2006.01) |
| ***B29K 75/00*** | (2006.01) |
| ***B29K 105/00*** | (2006.01) |
| ***B33Y 10/00*** | (2015.01) |
| ***B33Y 70/00*** | (2020.01) |
| ***C08F 220/34*** | (2006.01) |
| ***C09D 4/00*** | (2006.01) |

(52) U.S. Cl.

CPC .......... *C09D 133/14* (2013.01); *B29C 64/129* (2017.08); *B29C 64/282* (2017.08); *B33Y 10/00* (2014.12); *B33Y 70/00* (2014.12); *C08F 220/343* (2020.02); *C09D 4/00* (2013.01); *B29K 2033/08* (2013.01); *B29K 2075/00* (2013.01); *B29K 2105/0085* (2013.01)

(58) Field of Classification Search

CPC ...... C09D 133/14; C09D 4/00; B29C 64/129; B29C 64/282; B29C 64/124; B33Y 10/00; B33Y 70/00; C08F 220/343; C08F 2/50; B29K 2033/08; B29K 2075/00; B29K 2105/0085; G03F 7/0037; G03F 7/027; G03F 7/029; G03F 7/031

See application file for complete search history.

(56) References Cited

U.S. PATENT DOCUMENTS

| | | | | |
|---|---|---|---|---|
| 3,933,509 A | | 1/1976 | Noguchi et al. | |
| 4,041,476 A | | 8/1977 | Swainson | |
| 4,078,229 A | | 3/1978 | Swainson et al. | |
| 4,238,840 A | | 12/1980 | Swainson | |
| 4,288,861 A | | 9/1981 | Swainson et al. | |
| 4,333,165 A | | 6/1982 | Swainson et al. | |
| 4,466,080 A | | 8/1984 | Swainson et al. | |
| 4,471,470 A | | 9/1984 | Swainson et al. | |
| 5,230,986 A | | 7/1993 | Neckers | |
| 5,474,719 A | * | 12/1995 | Fan | B33Y 10/00 427/512 |
| 5,514,519 A | | 5/1996 | Neckers | |
| 5,936,878 A | | 8/1999 | Arsenov et al. | |
| 5,942,370 A | | 8/1999 | Neckers | |
| 6,548,593 B2 | | 4/2003 | Merz et al. | |
| 7,244,548 B2 | | 7/2007 | Barachevsky et al. | |
| 7,778,723 B2 | | 8/2010 | Cregger | |
| 8,071,666 B2 | | 12/2011 | Barthel et al. | |
| 9,376,602 B2 | | 6/2016 | Walther et al. | |
| 10,208,220 B2 | | 2/2019 | Shields et al. | |
| 10,392,523 B2 | | 8/2019 | Shields et al. | |
| 10,513,691 B2 | | 12/2019 | Matheu et al. | |
| 10,843,410 B2 | | 11/2020 | Lippert et al. | |
| 10,967,578 B2 | | 4/2021 | Clark | |

(Continued)

FOREIGN PATENT DOCUMENTS

| | | |
|---|---|---|
| DE | 10 2018 009916 A1 | 7/2020 |
| DE | 10 2018 009918 A1 | 7/2020 |

(Continued)

OTHER PUBLICATIONS

Extended European Search Report dated May 22, 2025 issued for European Patent Application No. 22846469.9 which is the European Counterpart of the present appliation.

Bao, Y., "Recent Trends in Advanced Photoinitiators for Vat Photopolymerization 3D printing", Macromol. Rapid Commun. 2022, 43, 2200202.

Hahn, V., et al., "3-D Laser Printing", Optics & Photonics News, pp. 30-36 Oct. 2019.

Ichimura, K., et al., „A Spiropyran-Iodonium Salt System as a Two Photon Radical Photoinitiator, J Polym. Sci: Part C: Polymer Letters, vol. 26, 185-189 (1988).

(Continued)

*Primary Examiner* — Michael M. Robinson

(57) ABSTRACT

Photohardenable compositions comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, and wherein the photohardenable composition displays non-Newtonian rheological behavior are disclosed. Methods including such photohardenable compositions for printing one or more objects are also disclosed.

18 Claims, No Drawings

(56) References Cited

U.S. PATENT DOCUMENTS

| | | | | |
|---|---|---|---|---|
| 11,007,710 | B2 | 5/2021 | Abbott, Jr. et al. | |
| 2007/0108644 | A1 | 5/2007 | Cregger | |
| 2007/0211110 | A1 | 9/2007 | Ifitime et al. | |
| 2009/0202919 | A1 | 8/2009 | Waldman et al. | |
| 2016/0067922 | A1 | 3/2016 | Voris et al. | |
| 2016/0221262 | A1 | 8/2016 | Das | |
| 2016/0271875 | A1 | 9/2016 | Brown, Jr. | |
| 2018/0015672 | A1 | 1/2018 | Shusteff et al. | |
| 2018/0147777 | A1* | 5/2018 | Abbott, Jr. | B33Y 10/00 |
| 2018/0326666 | A1 | 11/2018 | Kelly et al. | |
| 2018/0333913 | A1* | 11/2018 | Lin | B29C 64/264 |
| 2019/0160539 | A1 | 5/2019 | Lei et al. | |
| 2020/0063093 | A1 | 2/2020 | Matheu et al. | |
| 2020/0108557 | A1 | 4/2020 | Lippert et al. | |
| 2020/0361152 | A1 | 11/2020 | Shusteff et al. | |
| 2020/0384682 | A1 | 12/2020 | Loterie et al. | |
| 2022/0025255 | A1 | 1/2022 | Congreve et al. | |
| 2022/0055290 | A1 | 2/2022 | Hahn et al. | |
| 2022/0305723 | A1* | 9/2022 | Garmshausen | B33Y 10/00 |
| 2022/0410473 | A1 | 12/2022 | Garmshausen et al. | |
| 2023/0012690 | A1 | 1/2023 | Arndt | |
| 2023/0094821 | A1 | 3/2023 | Twietmeyer et al. | |
| 2024/0198583 | A1 | 6/2024 | Arndt et al. | |
| 2025/0066615 | A1 | 2/2025 | Kiel et al. | |
| 2025/0068071 | A1 | 2/2025 | Sanders et al. | |
| 2025/0072997 | A1 | 3/2025 | Deo | |
| 2025/0355353 | A1 | 11/2025 | Sanders et al. | |
| 2025/0361403 | A1 | 11/2025 | Kiel et al. | |

FOREIGN PATENT DOCUMENTS

| | | | |
|---|---|---|---|
| JP | H0375127 | A | 3/1991 |
| WO | WO 1994/011760 | A1 | 5/1994 |
| WO | WO 2016/048361 | A1 | 3/2016 |
| WO | WO 2019/194798 | A1 | 10/2019 |
| WO | WO 2020/139858 | A1 | 7/2020 |
| WO | WO 2020/245456 | A1 | 12/2020 |
| WO | WO 2021/089090 | A1 | 5/2021 |
| WO | WO 2021/154895 | A1 | 8/2021 |
| WO | WO 2021/154897 | A1 | 8/2021 |
| WO | WO 2021/202524 | A1 | 10/2021 |
| WO | WO 2021/247926 | A1 | 12/2021 |
| WO | WO 2021/247930 | A1 | 12/2021 |
| WO | WO 2023/003819 | A1 | 1/2023 |
| WO | WO 2023/003820 | A1 | 1/2023 |

OTHER PUBLICATIONS

International Search Report and Written Opinion mailed in PCT/US2022/037491 mailed Oct. 7, 2022 (Parent Application).

Jeudy, R., et al., "Spectral Photosensitization of a Variable Index Material for Recording Phase Holograms with High Efficiency", Opt. Commun. 1975, vol. 13, No. 1, pp. 25-28.

Jiang, Z., et al., "Extrusion 3D Printing of Polymeric Materials with Advanced Properties", Adv. Sci. 2020, 7, 2001379 (32 pages).

Lee, S-K., et al., "Benzospiropyrans as Photochromic and/or Thermochromic Photoinitiators", Chem. Mater. 1991, 3, pp. 852-858.

Lee, S-K., et al., "Two-photon radical photoinitiator system based on iodinated benzospiropyrans", Chem. Mater. 1991, 3, pp. 858-864.

Lee, Y-H, et al., "Fabrication of Periodic 3D Nanostructuration for Optical Surfaces by Holographic Two-Photon-Polymerization", Int'l Journal of Information and Electronics Engineering, vol. 6, No. 3, May 2016.

Liravi, F., et al., "Additive manufacturing of 3D structures with non-Newtonian highly viscous fluids: Finite element modeling and experimental validation", Additive Manufacturing (2016), http://dx.doi.org/10.1016/j.addma.2016.10.008.

Loterie, D., et al., "High-resolution tomographic volumetric additive manufacturing", Nature Communications (2020) 11:852 | https://doi.org/10.1038/s41467-020-14630-4 |www.nature.com/naturecommunications.

Lu, P., et al., "Wavelength-selective light-matter interactions in polymer science", Matter 4, 2172-2229, Jul. 7, 2021.

Reghely, M., et al., "Xolography for linear volumetric 3D printing ", Nature vol. 588 Dec. 24/31, 2020.

Reghely, M., et al., Supplementary Information—"Xolography for linear volumetric 3D printing ", NatureResearch 2020.

Texas Instruments Application Report DLPA022—Jul. 2010 entitled "DLP™ System Optics".

Texas Instruments "TI DLR Technology for 3D Printing—Design scalable high-speed stereolithograpy [sic] systems using TI DLP technology" 2016.

Texas Instruments "DLP6500 0.65 1080p MVSP Type A DMD", DLP6500, DLPS040A—Oct. 2014—Revised Oct. 2016.

Towns, Andrew D., Chapter 5 entitled "Industrial Photochromism" (pp. 227-279), Giacomo Bergamini, Serena Silvi (eds.), *Applied Photochemistry*, Lecture Notes in Chemistry 92, DOI 10.1007/978-3-319-31671-0_5, Publisher: Springer International Publishing Switzerland.

Wang, B., et al., Nature Communications (2022) 13:367 (https://doi.org/10.1038/s41467-022-28013-4).

NonFinal Office Action dated Jan. 9, 2026 issued in co-pending U.S. Appl. No. 19/273,579 of Quadratic 3d, Inc. filed Jul. 18, 2025, which is a continuation of the present application.

EPO Communication under Rule 114(2) EPC dated Mar. 23, 2026 forwarding observations by a third party concerning EP Application No. 22846469, which EP application is an EP counterpart of the PCT application which is The parent of the present application.

* cited by examiner

PHOTOHARDENABLE COMPOSITIONS AND METHODS FOR FORMING AN OBJECT IN A VOLUME OF A PHOTOHARDENABLE COMPOSITION

CROSS-REFERENCE TO RELATED APPLICATIONS

This application is a continuation of International Application No. PCT/US2022/037491 filed 18 Jul. 2022, which International Application claims priority to U.S. Provisional Patent Application No. 63/223,112 filed on 19 Jul. 2021; U.S. Provisional Patent Application No. 63/226,605 filed on 28 Jul. 2021; U.S. Provisional Patent Application No. 63/239,345 filed on 31 Aug. 2021; U.S. Provisional Patent Application No. 63/226,594 filed 28 Jul. 2021; and U.S. Provisional Patent Application No. 63/228,356 filed 2 Aug. 2021. Each of the foregoing International Application and U.S. Provisional Patent Applications is hereby incorporated herein by reference in its entirety for all purposes.

TECHNICAL FIELD OF THE INVENTION

The present relates to the technical field of volumetric printing and related materials, methods, and products thereof.

BRIEF SUMMARY OF THE INVENTION

The present invention includes improved photohardenable compositions and methods for forming an object in a volume and products thereof.

In accordance with one aspect of the present invention, there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photohardenable composition displays non-Newtonian rheological behavior.

The photohardenable composition can optionally further include one or more coinitiators (also referred to herein as synergists) and/or one or more sensitizers.

In accordance with another aspect of the present invention, there is provided a photohardenable composition comprising a photohardenable component and a photoswitchable photoinitiator, wherein exposure of the photoswitchable photoinitiator to light having a first wavelength generates a second form of the photoswitchable photoinitiator, which second form, upon exposure to light having a second wavelength, generates an excited species that can induce hardening of the photohardenable component, wherein the first and second wavelengths are different, and wherein the photohardenable composition displays non-Newtonian rheological behavior.

The photohardenable composition can optionally further include one or more coinitiators and/or one or more sensitizers.

In accordance with another aspect of the present invention there is provided a photohardenable composition comprising a photohardenable component and a photoswitchable photoinitiator, wherein exposure of the photoswitchable photoinitiator to light having a first wavelength generates a second form of the photoswitchable photoinitiator, which second form, upon exposure to light having a second wavelength, generates a non-emissive or substantially non-emissive excited species that can induce hardening of the photohardenable component, wherein the first and second wavelengths are different, and wherein the photohardenable composition displays non-Newtonian rheological behavior.

The photohardenable composition can optionally further include one or more coinitiators and/or one or more sensitizers.

In accordance with another aspect of the present invention there is provided a photohardenable composition comprising a photohardenable component, a photoswitchable photoinitiator, and further including one or more coinitiators and/or one or more sensitizers, wherein the photoswitchable photoinitiator is activatable by exposure to light having a first wavelength and light having a second wavelength to induce hardening of the photohardenable component, wherein the first and second wavelengths are different, and wherein the photohardenable composition displays non-Newtonian rheological behavior.

In accordance with another aspect of the present invention there is provided a photohardenable composition comprising a photohardenable component, a photoswitchable photoinitiator, and further including one or more coinitiators and/or one or more sensitizers, wherein exposure of the photoswitchable photoinitiator to light having a first wavelength generates a second form of the photoswitchable photoinitiator, which second form, upon exposure to light having a second wavelength, generates an excited species that can induce hardening of the photohardenable component to at least partially harden the photohardenable composition, wherein the first and second wavelengths are different, and wherein the photohardenable composition displays non-Newtonian rheological behavior.

In accordance with one aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce hardening of the photohardenable component, wherein the first and second wavelengths are different, wherein the photohardenable composition displays non-Newtonian rheological behavior, and wherein the photoswitchable photoinitiator is represented by formula (I):

(I)

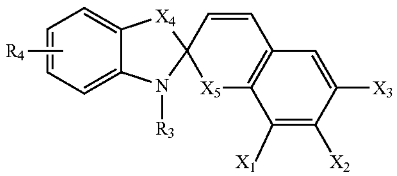

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, the methylene group being represented by formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

The photohardenable composition can optionally and further include a coinitiator and/or a sensitizer.

In accordance with another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce hardening of the photohardenable component, wherein the first and second wavelengths are different, wherein the photohardenable composition displays non-Newtonian rheological behavior, and wherein the photoswitchable photoinitiator is represented by formula (II):

(II)

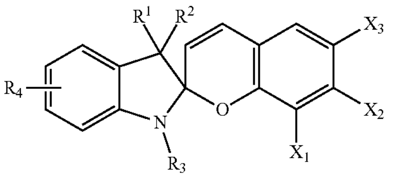

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

The photohardenable composition can optionally and further include a coinitiator and/or a sensitizer.

In accordance with another aspect of the present invention, there is provided a method of forming an object comprising: (a) providing a volume including a photohardenable composition in accordance with the present invention; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator, wherein the photoswitchable photoinitiator is activatable by exposure to light having the first wavelength and light having the second wavelength to induce a crosslinking or polymerization reaction in the photohardenable component, wherein the first and second wavelengths are different, and wherein the photohardenable composition displays non-Newtonian rheological behavior.

The photohardenable composition can further include one or more coinitiators and/or one or more sensitizers.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator, wherein exposure of the photoswitchable photoinitiator to light having the first wavelength generates a second form of the photoswitchable photoinitiator, which second form, upon exposure to light having the second wavelength, generates an excited species that can induce hardening of the photohardenable component, wherein the first and second wavelengths are different, and wherein the photohardenable composition displays non-Newtonian rheological behavior.

The photohardenable composition can further include one or more coinitiators and/or one or more sensitizers.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator, wherein exposure of the photoswitchable photoinitiator to light having the first wavelength generates a second form of the photoswitchable photoinitiator, which second form, upon exposure to light having the second wavelength, generates a non-emissive or substantially non-emissive excited species that can induce hardening of the photohardenable component, wherein the first and second wavelengths are different, and wherein the photohardenable composition displays non-Newtonian rheological behavior.

The photohardenable composition can further include one or more coinitiators and/or one or more sensitizers.

In accordance with another aspect of the present invention, there is provided a method of forming an object comprising: (a) providing a volume including a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, and optionally one or more coinitiators and/or one or more sensitizers, wherein the photopolymerizable composition displays non-Newtonian rheological behavior; (b) simultaneously or sequentially irradiating one or more selected locations within the volume of the photohardenable composition with light having the first wavelength and light having the second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the first and second wavelengths are different, and wherein the first wavelength is in a range from about 400 to about 410 nm (inclusive) and the second wavelength is in a range from about 450 to about 700 nm (inclusive).

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component, a photoswitchable photoinitiator represented by formula (I):

(I)

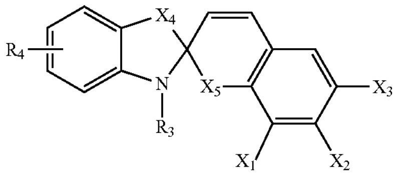

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, the methylene group being represented by the formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring, and at least one of $X_1$, $X_2$, and $X_3$ is iodo, and optionally one or more coinitiators and/or one or more sensitizers, wherein the photoswitchable photoinitiator is activatable by exposure to light having the first wavelength and light having the second wavelength to induce hardening of the photohardenable component, wherein the first and second wavelengths are different, and wherein the first wavelength is in a range from about 400 to about 410 nm (inclusive) and the second wavelength is in a range from about 450 to about 700 nm (inclusive),—and wherein the photohardenable composition displays non-Newtonian rheological behavior.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component, a photoswitchable photoinitiator represented by formula (II):

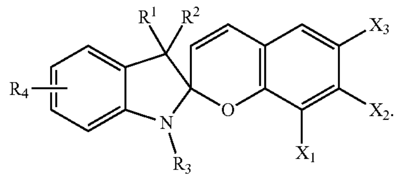

(II)

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring, and at least one of $X_1$, $X_2$, and $X_3$ is iodo, and optionally one or more coinitiators and/or one or more sensitizers, wherein the photoswitchable photoinitiator is activatable by exposure to light having the first wavelength and light having the second wavelength to induce hardening of the photohardenable component, wherein the first and second wavelengths are different, and wherein the first wavelength is in a range from about 400 to about 410 nm (inclusive) and the second wavelength is in a range from about 450 to about 700 nm (inclusive), and wherein the photohardenable composition displays non-Newtonian rheological behavior.

The foregoing, and other aspects and embodiments described herein and contemplated by this disclosure all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed.

Other embodiments will be apparent to those skilled in the art from consideration of the description, from the claims, and from practice of the invention disclosed herein.

DETAILED DESCRIPTION OF THE INVENTION

Various aspects and embodiments of the present invention will be further described in the following detailed description.

The present invention includes improved photohardenable compositions and methods for forming an object in a volume and products thereof.

Photohardenable compositions and methods in accordance with the present invention preferably include a photohardenable composition that displays non-Newtonian rheological behavior that advantageously can facilitate forming an object in a volume of a photohardenable composition described herein upon exposure to at least two different wavelengths of excitation light wherein the object remains at a fixed position or is minimally displaced in the volume of the unhardened photohardenable composition during formation of the object Minimal displacement refers to displacement of the object being formed during its formation in the volume that is acceptable for precisely producing the intended part (or object) geometry.

Photohardenable compositions and methods in accordance with the present invention preferably include a photohardenable composition that displays non-Newtonian rheological behavior that advantageously can facilitate separation of the formed object from the unhardened photohardenable composition upon application of stress. While not wishing to be bound by theory, upon the application of stress, the apparent viscosity of the non-Newtonian photohardenable composition can drop to a lower value (e.g., the steady shear viscosity) than the static value (e.g., zero shear viscosity or yield stress) allowing the unhardened photohardenable composition to more easily flow off and separate from the object.

In accordance with one aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, wherein the photohardenable composition displays non-Newtonian rheological behavior.

The photohardenable composition can optionally further include one or more coinitiators and/or one or more sensitizers. (Coinitiators are also referred to herein as synergists.)

In accordance with another aspect of the present invention, there is provided a photohardenable composition comprising a photohardenable component and a photoswitchable photoinitiator, wherein exposure of the photoswitchable photoinitiator to light having a first wavelength generates a second form of the photoswitchable photoinitiator, which second form, upon exposure to light having a second wavelength, generates an excited species that can induce hardening of the photohardenable component, wherein the first and second wavelengths are different, and wherein the photohardenable composition displays non-Newtonian rheological behavior.

The photohardenable composition can optionally further include one or more coinitiators and/or one or more sensitizers.

In accordance with another aspect of the present invention there is provided a photohardenable composition comprising a photohardenable component and a photoswitchable photoinitiator, wherein exposure of the photoswitchable photoinitiator to light having a first wavelength generates a second form of the photoswitchable photoinitiator, which second form, upon exposure to light having a second wavelength, generates a non-emissive or substantially non-emissive excited species that can induce hardening of the photohardenable component to at least partially harden the photohardenable composition, wherein the first and second wavelengths are different, wherein the photohardenable composition displays non-Newtonian rheological behavior.

The photohardenable composition can optionally and further including one or more coinitiators and/or one or more sensitizers.

In accordance with another aspect of the present invention, there is provided a photohardenable composition comprising a photohardenable component, a photoswitchable photoinitiator, and further comprising one or more coinitiators and/or one or more sensitizers, wherein the photoswitchable photoinitiator is activatable by exposure to light having a first wavelength and light having a second wavelength to induce hardening of the photohardenable component, wherein the first and second wavelengths are different, and wherein the photohardenable composition displays non-Newtonian rheological behavior.

In accordance with another aspect of the present invention there is provided a photohardenable composition comprising a photohardenable component, a photoswitchable photoinitiator, and further comprising one or more coinitiators and/or one or more sensitizers, wherein exposure of the photoswitchable photoinitiator to light having a first wavelength generates a second form of the photoswitchable photoinitiator, which second form, upon exposure to light having a second wavelength, generates an excited species that can induce hardening of the photohardenable component to at least partially harden the photohardenable composition, wherein the first and second wavelengths are different, wherein the photohardenable composition displays non-Newtonian rheological behavior.

In accordance with another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce hardening of the photohardenable component, wherein the first and second wavelengths are different, wherein the photohardenable composition displays non-Newtonian rheological behavior, and wherein the photoswitchable photoinitiator is represented by formula (I):

(I)

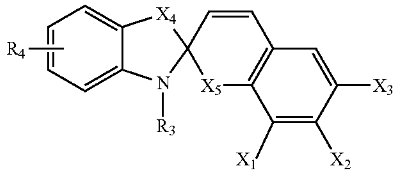

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, the methylene group being represented by formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

The photohardenable composition can optionally further include one or more coinitiators and/or one or more sensitizers.

In accordance with another aspect of the present invention there is provided a photohardenable composition comprising a photohardenable component and a photoswitchable photoinitiator, wherein the photoswitchable photoinitiator is activatable by exposure to light having a first wavelength and light having a second wavelength to induce hardening of the photohardenable component, wherein the first and second wavelengths are different, wherein the photohardenable composition displays non-Newtonian rheological behavior, and wherein the photoswitchable photoinitiator is represented by formula (II):

(II)

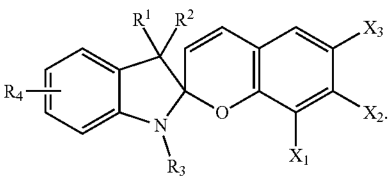

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

The photohardenable composition can optionally further include one or more coinitiators and/or one or more sensitizers.

A photohardenable composition in accordance with the present invention preferably displays non-Newtonian rheological behavior.

Examples of such non-Newtonian rheological behavior include but are not limited to pseudoplastic fluid, yield pseudoplastic, Bingham pseudoplastic, or Bingham plastic behavior.

Non-Newtonian rheological behavior can be imparted to the photohardenable composition by including one or more reactive components (e.g. urethane acrylate oligomers, urethane methacrylate oligomers, acrylated or methacrylated polyurethanes, acrylated or methacrylated polyurethane-ureas, acrylated or methacrylated polyesters, acrylated or methacrylated polyamides, acrylate- or methacrylate-functional block copolymers, alkenyl- or alkynyl-functional urethane oligomers, alkenyl- or alkynyl-functional polyurethanes, alkenyl- or alkynyl- functional polyurethane-ureas, alkenyl- or alkynyl-functional polyesters, alkenyl- or alkynyl-functional polyamides, alkenyl- or alkynyl-functional block copolymers, thiol-functional urethane oligomers, thiol-functional polyurethanes, thiol-functional polyurethane-ureas, thiol-functional polyesters, thiol-functional polyamides, thiol-functional block copolymers) in the photohardenable component and/or by further adding one or more nonreactive additives (e.g., but not limited to, one or more thixotropes and/or rheology modifiers) to the photohardenable composition. Selection of the one or more of reactive components and the amounts thereof for addition to the photohardenable component to impart non-Newtonian rheological behavior thereto is within the skill of the skilled artisan in the relevant art without undue experimentation. Similarly, selection of nonreactive additives and the amount(s) thereof for addition to the photohardenable composition to impart non-Newtonian rheological behavior thereto is within the skill of the skilled artisan of the relevant art without undue experimentation.

For photohardenable compositions in accordance with the present invention, preferred steady shear viscosities are less than 30,000 centipoise, more preferably less than 10,000 centipoise, and most preferably less than 1,000 centipoise. (Steady shear viscosity refers to the viscosity after the thixotrope network has broken up.) Steady shear viscosities may be measured at ambient (e.g., room temperature), printing temperature, or some other temperature (e.g., elevated or reduced). Measurement at printing temperature may provide advantage in determining the suitability of photohardenable composition for printing.

A photohardenable composition in accordance with the present invention includes a photoswitchable photoinitiator. Examples of photoswitchable photoinitiators include a photochromic molecule (e.g., a photochromic dye molecule) that can be converted to a second form (or active form) upon irradiation with light of a first wavelength, which second form can be converted to an excited state upon irradiation with light of a second wavelength, the second state being capable of inducing hardening of a photohardenable component. The conversion of a photochromic molecule to a second form of the molecule (e.g., an isomer thereof, e.g., for a photochromic molecule having a closed ring structure to a second from which is an open ring form thereof) is preferably a reversible photochemical structural change.

Properties for consideration in the selection of a photoswitchable photoinitiator include absorbance spectra for the inactive and active forms; switching rates for the transitions between both forms; and equilibrium concentration of both forms; and intersystem crossing yield of the excited state of the active form. A photoswitchable photoinitiator that spontaneously reverts from active form to inactive form via thermal energy at the ambient temperature (T-type photochromism) can be preferred. Various types of T-type photochromic dyes are known to those skilled in the art, including but not limited to benzospiropyrans.

Examples of compounds which can undergo reversible intramolecular transformations by irradiation (photochromic) include benzospiropyrans (BSP) described in U.S. Pat. No. 5,230,986 of Neckers, which is hereby incorporated herein by reference. BSPs are an example of a class of compounds which undergo reversible intramolecular transformations forming the merocyanine isomer (MC) by irradiation (photochromic). (BSPs can also undergo reversible intramolecular transformations forming MC by heating.) BSPs can function by light activated ring opening to form a merocyanine dye (active form). The active form may subsequently absorb light of a different wavelength to form an excited state of the active form which may subsequently induce photoinitiation, either alone or in combination with a co-initiator (also called a synergist) (e.g., amine, thiol, organoborate compounds, onium salts).

Other examples of photoswitchable photoinitiators include, but are not limited to, spirolactam rhodamines and derivatives thereof.

One or more coinitiators (e.g., a coinitiators which are reducing agents or hydrogen donating compounds) can be included with a photoswitchable photoinitiator, e.g., but not limited to photoswitchable photoinitiators comprising a BSP.

Examples of photoswitchable photoinitiators include BSPs represented by the formula (I):

(I)

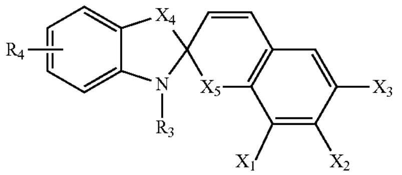

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, the methylene group being represented by formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

The term "alkyl" as used herein refers to alkyl groups having 1 to 20 (more typically 1 to 10) carbon atoms which may be straight chain, branched chain, or cyclic alkyl groups. The term "alkoxy" refers to alkoxy groups having 1 to 20 (more typically 1 to 10) carbon atoms which may be straight or branched chain and include methoxy, ethoxy, etc. The term "aryl" as used herein refers to aryl groups having 6 to 10 carbon atoms such as phenyl and naphthyl. The term "aralkyl" refers to aralkyl groups having 7 to 20 carbon atoms including benzyl. The term "alkylaryl" means alkylaryl groups having 7 to 20 carbon atoms including methylphenyl, ethylphenyl, etc. The term "amido" refers to groups of the structure —$CONR^2$ and the term "carboxy ester" refers to groups of the structure —COOR wherein R can be hydrogen, alkyl, or aryl in the case of the amido group and R is alky in the case of the ester.

Examples of BSPs for use as a photoswitchable photoinitiator in the photohardenable composition of the present invention include BSP's represented by the formula (II):

(II)

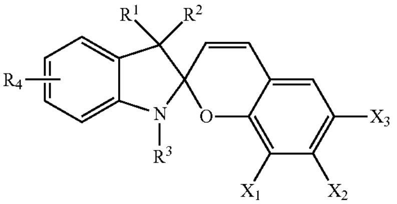

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

More particular examples of BSPs for use as photoswitchable photoinitiator include BSPs represented by formula (II) wherein at least one of $X_1$, $X_2$, and $X_3$ is iodo or BSPs represented by formula (II) wherein at least one of $X_1$, $X_2$, and $X_3$ is iodo and $R^1$ and $R^2$ are methyl, and $R^3$ is methyl or benzyl.

Preferred examples of BSPs for use as photoswitchable photoinitiators in photohardenable compositions and methods of the present invention include those represented by formula (II):

(II)

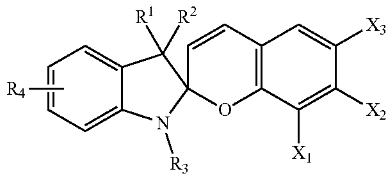

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring, and wherein $X_1$ is iodo, $X_2$ is an alkoxy group, $X_3$ is a nitro group, and $R^4$ is hydrogen or a cyano group.

Such preferred examples of BSPs include, but are not limited to, those represented by following formulae (III) and (IV):

(III)

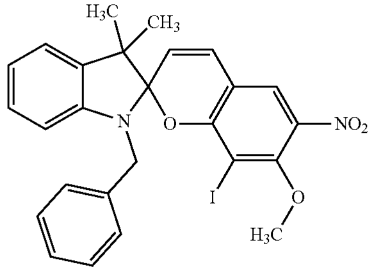

(IV)

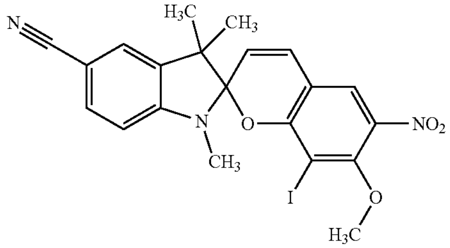

Several additional considerations in selecting a photoswitchable photoinitiator include, by way of example, but not limited to, the absorption spectra and A max of the photochromic molecule and its second forms, the solubility of the photoswitchable photoinitiator in the photohardenable component, the photosensitivity of the second form of the photoswitchable photoinitiator, the amount of initial concentration of the second form in the monomer solution, the stability of the photoswitchable photoinitiator, and the reduction and oxidation potentials of the second form of the photoswitchable photoinitiator.

BSPs are particularly suitable for use in the photohardenable compositions and methods of the present invention for forming three-dimensional objects because the molecule and its second form (the MC) have sufficiently distinct absorption spectra that once the molecule is converted to the MC form, the MC form absorbs in a wavelength region where the molecule form is substantially non-absorbing. In this way, the MC form can be independently excited with the second wavelength without causing unintended excitation of the molecule form by the second wavelength. The second wavelength can excite the MC form to generate free radicals or otherwise induce desired hardening of the photohardenable component once the MC form has been generated by exposure to the first wavelength.

Examples of photohardenable components useful in the present invention include ethylenically unsaturated compounds and, more specifically, a polyethylenically unsaturated compounds. These compounds include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol, and the like; and acrylate or methacrylate terminated epoxy resins, acrylate or methacrylate terminated polyesters, etc. Representative examples include ethylene glycol diacrylate, ethylene glycol dimethacrylate, trimethylolpropane triacrylate (TMPTA), pentaerythritol tetraacrylate, pentaerythritol tetramethacrylate, dipentaerythritol hydroxypentacrylate (DPHPA), hexanediol-1,6-dimethacrylate, and diethyleneglycol dimethacrylate. Preferred examples include, but are not limited to, a urethane acrylate or a urethane methacrylate.

As provided herein, a photohardenable composition in accordance with certain aspects of the present invention can include one or more coinitiators and/or one or more sensitizers.

Examples of coinitiators (which are also referred to herein as synergists) that may be useful can be selected from among those known in the art and, more particularly, tertiary amines and organoborate salts. Iodonium salts may also be useful, particularly in combination with a borate salt. In certain embodiments, an iodonium salt may also be included in combination with a tertiary amine. Examples of other useful electron donating coinitiators are discussed by Eaton, D. F., "Dye Sensitized Photopolymerization", Advances in Photochemistry, Vol. 13, pp 427-486.

Representative examples of N,N-dialkylanilines useful in the present invention as coinitiators include 4-cyano-N,N-dimethylaniline, 4-acetyl-N,N-dimethylaniline, 4-bromo-N, N-dimethylaniline, 4-methyl-N, N-dimethylaniline, 4-ethoxy-N,N-dimethylaniline, N,N-dimethylthioanicidine, 4-amino-N,N-dimethylaniline, 3-hydroxy-N, N-dimethylaniline, N,N,N,'N,-tetramethyl-1,4-dianiline, 4-acetamido-N,N-dimethylaniline, 2,6-diethyl-N,N-dimethylaniline, N,N,2,4,6-pentanethylaniline (PMA) and p-t-butyl-N,N-dimethylaniline.

Certain other tertiary amines are also useful coinitiators including triethylamine, triethanolamine, N-methyldiethanolamine, 2-ethyl-4-(dimethylamino)benzoate, 2-ethylhexyl-4-(dimethylamino)benzoate, etc.

Another class of useful coinitiators are alkyl borate salts such as ammonium salts of borate anions of the formula $BR^5R^6R^7R^8$ wherein $R^5$-$R^8$ are independently selected from the group consisting of alkyl, aryl, alkaryl, allyl, aralkyl, alkenyl, alkynyl, alicyclic and saturated or unsaturated heterocyclic groups. Representative examples of alkyl groups represented by $R^5$-$R^8$ are methyl, ethyl, propyl, butyl, pentyl, hexyl, octyl, stearyl, etc. The alkyl groups may be substituted, for example, by one or more halogen, cyano, acyloxy, acyl, alkoxy or hydroxy groups. Representative examples of aryl groups represented by $R^5$-$R^8$ include phenyl, naphthyl and substituted aryl groups such as anisyl and alkaryl such as methylphenyl, dimethylphenyl, etc. Representative examples of aryl groups represented by $R^5$-$R^8$ include benzyl. Representative alicyclic groups include cyclobutyl, cyclopentyl, and cyclohexyl groups. Examples of an alkynyl group aryl propynyl and ethynyl, and examples of alkenyl groups include a vinyl group. Preferably, at least one but not more than three of $R^5$, $R^6$, $R^7$, and $R^8$ is an alkyl group. Each of $R^5$, $R^6$, $R^7$, and $R^8$ can contain up to 20 carbon atoms, and they typically contain 1 to 7 carbon atoms. More preferably $R^5$-$R^8$ are a combination of alkyl group(s) and aryl-group(s) or aralkyl group(s) and still more preferably a combination of three aryl groups and one alkyl group, i.e., an alkyltriphenylborate, e.g., but not limited to, a butyltriphenyl borate.

Non-limiting examples of preferred coinitiators (synergists) include an amine, a thiol, a thioether, a mercaptan, a silane, an organoborate compound, a diaryliodonium salt, a triarylsulfonium salt. A preferred example of a suitable coinitiator (or synergist) is butyryl choline butyltriphenylborate. When included in a photohardenable composition, a coinitiator (or synergist), in combination with the photoswitchable photoinitiator, facilitates photoinitiation by the photoswitchable photoinitiator active form via, e.g., electron transfer or hydrogen transfer.

As provided herein, a photohardenable composition in accordance with certain aspects of the present invention can include one or more sensitizers.

A sensitizer can create the excited state of the photoswitchable photoinitiator via absorbing light and transferring energy to the photoswitchable photoinitiator. For example, a sensitizer can control the sensitivity of the composition and to extend the spectral sensitivity of the BSP closed form of the photoswitchable photoinitiator. Useful sensitizers include those known in the art such as acetophenone, benzophenone, 2-acetonaphthone, isopropyl thioxanthone, alkoxyketocoumarins, Esacure 3644, etc. A sensitizer comprising Esacure 3644 can be preferred.

As mentioned herein, a photohardenable composition in accordance with the present invention can optionally include a synergist (or coinitiator). Non-limiting examples of synergists (or coinitiators) include an amine, a thiol, a thioether, a mercaptan, a silane, an organoborate compound, a diaryliodonium salt, a triarylsulfonium salt. A preferred example of a suitable synergist is butyryl choline butyltriphenylborate. When included in a photohardenable composition, a synergist, in combination with the photoswitchable photoinitiator, facilitates photoinitiation by the photoswitchable photoinitiator active form via, e.g., electron transfer or hydrogen transfer.

As provided herein, a photohardenable composition in accordance with certain aspects of the present invention can include one or more coinitiators and one or more sensitizers.

Fillers

Optionally, photohardenable compositions in accordance with the present invention can further include one or more fillers. Fillers can be included in an amount greater than 0 to about 90 weight percent, the amount being determined by the purpose for the filler and the desired end use characteristics for the intended three-dimensional object.

Fillers may be used to modify the properties of the hardened photohardenable composition, for example the stiffness, strength, toughness, impact resistance, resistance to creep, resistance to fatigue, mechanical energy return, mechanical loss tangent, glass transition temperature, thermal degradation temperature, thermal conductivity, thermal resistance, moisture uptake, electrical conductivity, static dissipation, dielectric constant and loss tangent, density, refractive index, optical dispersion, opacity to ionizing radiation, and resistance to ionizing radiation. Fillers may also be used to modify the properties of the liquid photohardenable composition, such as rheological properties such as viscosity and thixotropy and optical properties such as refractive index. Examples of fillers include but are not limited to silica, alumina, zirconia; silicates glasses such as soda-lime glass, borosilicate glass, sodium silicate glass, lead glass, aluminosilicate glass, barium glass, thorium glass, glass ceramics; chalcogenide glasses; glass microspheres and microbubbles; nanoclays such as laponite, montmorillonite, bentonite, kaolinite, hectorite, and halloysite; calcium phosphate minerals such as hydroxyapatite, mineral fillers such as chalk, rock dust, slag dust, fly ash, hydraulic cement, loess, limestone, kaolin, talc, and wollastonite. Examples of particle size ranges include but are not limited to less than 10 microns, less than 1 micron, 10 nm to 500 nm, 10 nm to 90 nm, 40 nm to 70 nm. Smaller particles sizes, in particular sizes less than about 100 nm, may be beneficial to provide high optical clarity of the liquid composition to better facilitate printing. Controlling the particle size distribution, for example monodisperse, bimodal, or trimodal distributions of sizes, may be beneficial to control rheological properties, increase filler weight percent, or modify the properties of the photohardenable composition.

Other Additives

As mentioned above, photohardenable compositions in accordance with the present invention can further include one or more additives. Examples of additives include, but are not limited to, a thixotrope/rheology modifier, a defoamer, a stabilizer, an oxygen scavenger, and a non-reactive solvent diluent. Any additive can be a single additive or a mixture of additives. For example, a thixotrope can comprise a single thixotrope or a mixture of two or more thixotropes.

Additives are preferably selected so that they do not react with the photohardenable component, the photoswitchable photoinitiator, or any other additives that may be included in photohardenable compositions.

Thixotrope/Rheology Modifier

Thixotropes and rheology modifiers suitable for inclusion in a photohardenable composition described herein include, for example and without limitation, urea derivatives; modified urea compounds such as Rheobyk 410 and Rheobyk-D 410 available from BYK-Chemie GmbH, part of the ALTANA Group; fumed metal oxides (also referred to as pyrogenic metal oxides) including for example, but not limited to, fumed silica, fumed alumina; zirconia; precipitated metal oxides including for example, but not limited to, precipitated silica, precipitated alumina; unmodified and organo-modified phyllosilicate clays; dimer and trimer fatty acids; polyether phosphates; oxidized polyolefins; hybrid oxidized polyolefins with polyamide; alkali soluble/swellable emulsions; cellulosic ethers; hydrophobically-modified alkali soluble emulsions; hydrophobically-modified ethylene oxide-based urethane; sucrose benzoate; ester terminated polyamides; tertiary amide terminated polyamides; polyalkyleneoxy terminated polyamides; polyether amides; acrylamidomethyl-substituted cellulose ester polymers; polyethyleneimine; polyurea; organoclays; hydrogenated castor oil; organic base salts of a clay mineral (e.g., montmorilionite) and other silicate-type materials; aluminum, calcium, and zinc salts of fatty acids, such as auric or stearic acid.

See U.S. Pat. No. 6,548,593 of Merz, et al., issued Apr. 15, 2003, and U.S. Pat. No. 9,376,602 of Walther, et al. issued Jun. 28, 2016, which are hereby incorporated herein by reference in their entireties, for information relating to urea derivatives that may be useful as thixotropes.

Thermally reversible gellants such as ester terminated polyamides, tertiary amide terminated polyamides, polyalkyleneoxy terminated polyamides, and polyether amides, and combinations thereof, may be desirable for us as thixotropes. Examples include Crystasense LP1, Crystasense LP2, Crystasense LP3, Crystasense MP, Crystasense HP4, Crystasense HP5, Rheoptima X17, Rheoptima X24, Rheoptima X38, Rheoptima X58, Rheoptima X73, and Rheoptima X84 available from Croda. Crystasense HP-5 is a preferred example of a thixotrope.

Metal oxides that have been surface-treated to impart dispersibility characteristics compatible with the hardenable resin component may be desirable for use as thixotropes.

A thixotrope can be included in a photohardenable composition described herein in an amount in a range from about 0.5 weight percent to about 15 weight percent of the photohardenable composition.

A thixotrope is preferably included in a photohardenable composition in an amount effective to at least partially restrict movement of the three-dimensional object or one or more regions thereof in the photohardenable composition during formation.

More preferably, the thixotrope is included in the photohardenable composition in an amount effective to at least partially restrict movement of the three-dimensional object suspended (without contact with a container surface) in the volume of the photohardenable composition during formation. Most preferably the position of the object in the volume of the photohardenable composition remains fixed position during formation of the object.

Defoamer

A defoamer can be included to aid in removing bubbles introduced during processing and handling. A preferred defoamer is BYK 1798 (a silicone based defoamer) available from BYK-Chemie GmbH, part of the ALTANA Group.

A defoamer can be included in a photohardenable composition described herein in an amount in a range from about 0.001 weight percent to about 1 weight percent of the photohardenable composition.

Stabilizer

A stabilizer can be included to improve shelf-life of the photohardenable composition and/or to control the level of cure and/or spatial resolution during printing. An example of preferred stabilizer is TEMPO (2,2,6,6-tetramethylpiperidinooxy free radical available from Sigma-Aldrich). Examples of other stabilizers include, but are not limited to, hindered phenols such as butylated hydroxytoluene; hydroquinone and its derivatives such as hydroquinone methyl ether; hindered amine light stabilizers; alkylated diphenylamines; and phosphite esters.

A stabilizer can be included in a photohardenable composition described herein in an amount in a range from about 0.0001 weight percent to about 1 weight percent of the photohardenable composition.

Oxygen Scavenger

An oxygen scavenger can be included to react with oxygen (e.g., singlet oxygen, dissolved oxygen) present in the photohardenable composition.

An oxygen scavenger can be included in a photohardenable composition described herein in an amount in a range from about 0.0001 weight percent to about 1 weight percent of the photohardenable composition.

Non-Reactive Solvent

A non-reactive solvent diluent can be included. Examples include, but are not limited to, acetone, amyl acetate, n-butanol, sec-butanol, tert-butanol, butyl acetate, cyclohexanone, decane, dimethylacetamide, dimethylformamide, dimethylsulfoxide, dipropylene glycol, dipropylene glycol methyl ether, ethanol, ethyl acetate, ethylene glycol, glycerol, heptane, isopropanol, isopropyl acetate, methyl ethyl ketone, N-methyl pyrrolidone, propylene carbonate, propylene glycol, propylene glycol diacetate, tetrahydrofuran, tripropylene glygol methyl ether, toluene, water, xylenes.

A non-reactive solvent can be included in a photohardenable composition described herein in an amount in a range from about 0.1 weight percent to about 95 weight percent of the photohardenable composition.

Thermally Activated Radical Initiator

It may also be desirable to include a thermally activated radical initiator in a photohardenable composition. Thermally activated radical initiator examples include but are not limited to 2,2'-azobis(2-methylpropionitrile), 1,1'-azobis(cyclohexanecarbonitrile), 2,2'-azobis[N-(2-carboxyethyl)-2-methylpropionamidine] n-hydrate, 2,2'-azobis[2-methyl-N-(2-hydroxyethyl)propionamide], organic peroxides, inorganic peroxides, peroxydisulfate salts.

A thermally activated radical initiator can be included in a photohardenable composition described herein in an amount in a range from about 0.001 weight percent to about 10 weight percent of the photohardenable composition.

The nature of the monomer, the amount of the photoswitchable photoinitiator and, when applicable, a coinitiator and/or a sensitizer or other optional additive, in photohardenable compositions in accordance with the present invention will vary with the particular use of the compositions, the emission characteristics of the exposure sources, the development procedures, the physical properties desired in the polymerized product and other factors.

Examples of photohardenable compositions in accordance with certain aspects of the invention including one or more coinitiators will generally have compositions which fall within the following compositional ranges in parts by weight (based on 100 parts total):

Photohardenable component*—about 89.5 to about 99.998

* The lower value in the range for the photohardenable component may be reduced taking into account any amounts of other optional additives that may be included in the photohardenable composition.

Photoswitchable photoinitiator—about 0.001 to about 0.5

Coinitiators—about 0.001 to about 10

Sensitizer (optional)—about 0.1 to about 1.

A preferred coinitiator compositional range in part by weight (based on 100 parts total) can be from about 0.001 to about 20.

Examples of photohardenable compositions in accordance with certain aspects of the invention including one or more sensitizers will generally have compositions which fall within the following compositional ranges in parts by weight (based on 100 parts total):

Photohardenable component*—about 98.5 up to about 99.899

* The lower value in the range for the photohardenable component may be reduced taking into account any amounts of other optional additives that may be included in the photohardenable composition.

Photoswitchable photoinitiator—about 0.001 to about 0.5

Sensitizer—about 0.1 to about 1.

Coinitiators (optional)—about 0.001 to about 10

Examples of photohardenable compositions in accordance with certain aspects the invention not including either coinitiators or sensitizers will generally have compositions which fall within the following compositional ranges in parts by weight (based on 100 parts total):

Photohardenable component*—about 99.5 to about 99.999

* The lower value in the range for the photohardenable component may be reduced taking into account any amounts of other optional additives that may be included in the photohardenable composition.

Photoswitchable photoinitiator—about 0.001 to about 0.5

In accordance with an aspect of the present invention, there is provided a method of printing an object comprising: (a) providing a volume including a photohardenable composition in accordance with the present invention; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed.

Preferably the volume of the photohardenable composition is included within a container wherein at least one or more portions of the container are optically transparent so that the photohardenable composition is accessible by light used to irradiate the photohardenable composition.

Examples of power densities for the first wavelength light include power densities in a range from about 0.01 to about 100,000 W/cm$^2$ (inclusive). Examples of power densities for the second wavelength light include power densities in a range from about 0.01 to about 100,000 W/cm$^2$ (inclusive).

Examples of exposure energies for the first wavelength light include exposure energies in a range from about 0.001 to about 1,000 mJ/cm$^2$ (inclusive). Examples of exposure energies for the second wavelength light include exposure energies in a range from about 0.01 to about 100,000 mJ/cm$^2$ (inclusive).

Photohardenable compositions and methods in accordance with the present invention can facilitate forming an object in a volume of a photohardenable composition in accordance with the invention, preferably a three-dimensional object, that is fully suspended in the volume of the photohardenable composition during formation. The ability to have the object fully suspended in the volume during formation advantageously eliminates the need to include support structures of the type used in stereolithography to maintain the geometry/shape of the object during formation (which is sometimes referred to as printing or 3D printing). Avoiding addition of support structures can advantageously simplify post-processing of printed objects and improve object surface quality. Non-Newtonian rheological behavior of the photohardenable composition can additionally simplify separation of the object from the unhardened volume of photohardenable composition in which it is formed because upon application of stress, the apparent viscosity of the non-Newtonian photopolymerizable liquid drops to a lower value (e.g., the steady shear viscosity) than the static value (e.g., zero shear viscosity or yield stress) allowing the unhardenable photohardenable composition to more easily flow off and separate from the object. Heating of the unhardened photohardenable composition in addition to applying stress may further enhance the ability of the liquid to flow off and separate from the object.

For use in making three-dimensional objects, it is desired that photohardenable compositions do not harden (e.g., the photohardenable component does not undergo polymerization or cross-linking) upon exposure of the photohardenable composition to only the first wavelength or only the second wavelength. In other words, it is desired that hardening of the photohardenable composition in the volume which is not simultaneously or nearly simultaneously (e.g., due to the closely timed sequential exposure) exposed to both radiations do not polymerize. In particular, in scanning a volume of the photohardenable media, as a result of beams passing through previously exposed areas or planes, there will be numerous points in the volume which are sequentially scanned in any order with the first wavelength radiation and the second wavelength radiation as the structure of the object is defined in the volume of the medium by the intersection of the beams. Some points may also experience multiple exposures to the first wavelength light and/or second wavelength light. It is desirable to select photoswitchable photoinitiators which rapidly reverse when they are not being exposed to first wavelength light.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator, wherein the photoswitchable photoinitiator is activatable by exposure to light having the first wavelength and light having the second wavelength to induce a crosslinking or polymerization reaction in the photohardenable component, wherein the first and second wavelengths are different, wherein the photohardenable composition displays non-Newtonian rheological behavior.

The photohardenable composition can further include one or more coinitiators and/or one or more sensitizers.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator, wherein exposure of the photoswitchable photoinitiator to light having the first wavelength generates a second form of the photoswitchable photoinitiator, which second form, upon exposure to light having the second wavelength, generates an excited species that can induce hardening of the photohardenable component, wherein the first and second wavelengths are different, and wherein the photohardenable composition displays non-Newtonian rheological behavior.

The photohardenable composition can further include one or more coinitiators and/or one or more sensitizers.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator, wherein exposure of the photoswitchable photoinitiator to light having the first wavelength generates a second form of the photoswitchable photoinitiator, which second form, upon exposure to light having the second wavelength, generates a non-emissive or substantially non-emissive excited species that can induce hardening of the photohardenable component, wherein the first and second wavelengths are different, and wherein the photohardenable composition displays non-Newtonian rheological behavior.

The photohardenable composition can further include one or more coinitiators and/or one or more sensitizers.

In accordance with another aspect of the present invention, there is provided a method of forming an object comprising: (a) providing a volume including a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, and optionally one or more coinitiators and/or one or more sensitizers, wherein the photopolymerizable composition displays non-Newtonian rheological behavior; (b) simultaneously or sequentially irradiating one or more selected locations within the volume of the photohardenable composition with light having the first wavelength and light having the second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the first and second wavelengths are different, and wherein the first wavelength is in a range from about 400 to about 410 nm (inclusive) and the second wavelength is in a range from about 450 to about 700 nm (inclusive).

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component, a photoswitchable photoinitiator represented by formula (I):

(I)

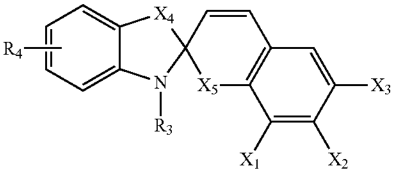

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, the methylene group being represented by the formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring, and wherein at least one of $X_1$, $X_2$, and $X_3$ is iodo, and optionally one or more coinitiators and/or one or more sensitizers, wherein the photoswitchable photoinitiator is activatable by exposure to light having the first wavelength and light having the second wavelength to induce hardening of the photohardenable component, wherein the first and second wavelengths are different, and wherein the first wavelength is in a range from about 400 to about 410 nm (inclusive) and the second wavelength is in a range from about 450 to about 700 nm (inclusive), and wherein the photohardenable composition displays non-Newtonian rheological behavior.

In accordance with another aspect of the present invention, there is provided a method of forming an object comprising: (a) providing a volume including a photohardenable composition; (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component, a photoswitchable photoinitiator represented by formula (II):

(II)

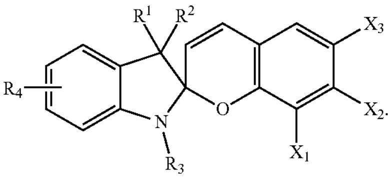

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring, and at least one of $X_1$, $X_2$, and $X_3$ is iodo, and optionally a coinitiator and/or sensitizer, wherein the photoswitchable photoinitiator is activatable by exposure to light having the first wavelength and light having the second wavelength to induce a crosslinking or polymerization reaction in the photohardenable component, wherein the first and second wavelengths are different, and wherein the first wavelength is in a range from about 400 to about 410 nm (inclusive) and the second wavelength is in a range from about 450 to about 700 nm (inclusive).

Preferably the photohardenable composition displays non-Newtonian rheological behavior.

More preferred examples of photoswitchable photoinitiators represented by formula (II) include those wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring, and wherein $X_1$ is iodo, $X_2$ is an alkoxy group, $X_3$ is a nitro group, and $R^4$ is hydrogen or a cyano group.

Such more preferred examples of photoswitchable photoinitiators include, but are not limited to, those represented by following formulae (III) and (IV):

(III)

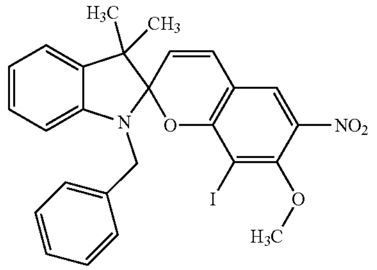

(IV)

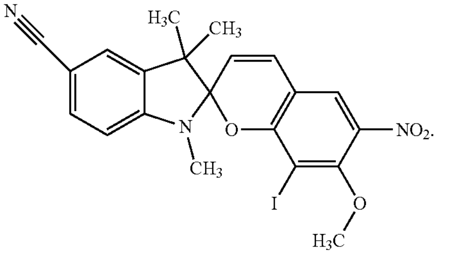

Preferably the volume of the photohardenable composition is included within a container wherein at least one or more portions of the container are optically transparent so that the photohardenable composition is accessible by light used to irradiate the photohardenable composition.

Examples of power densities for the first wavelength light include power densities in a range from about 0.01 to about 100,000 W/cm$^2$ (inclusive). Examples of power densities for the second wavelength light include power densities in a range from about 0.01 to about 100,000 W/cm$^2$ (inclusive).

Examples of exposure energies for the first wavelength light include exposure energies in a range from about 0.001 to about 1,000 mJ/cm$^2$ (inclusive). Examples of exposure energies for the second wavelength light include exposure energies in a range from about 0.01 to about 100,000 mJ/cm$^2$ (inclusive).

The methods of the invention described herein can further include post-processing. Examples of post-processing steps that may be further included in a method in accordance with the invention include, but are not limited to, one or more of the following: separating the printed object(s) from the unhardened photopolymerizable composition in which it(they) is(are) formed, washing, post-curing (e.g., by light, heat, ionizing radiation, pressure, or simultaneous or sequential combinations of techniques), metrology, freeze-dry processing, critical point drying, and packaging.

In accordance with the preferred embodiments of the invention for forming a three-dimensional object, it is desirable to select a photoswitchable photoinitiator molecule for which the wavelength of first excitation has significant absorption for the first form, and where the second form of the photoinitiator has minimal absorption of the first excitation wavelength. This has two advantages, first, it simplifies exposure in that activation of the photoswitchable photoinitiator can occur without activating the second form thereof to induce a crosslinking or polymerization reaction in the photohardenable component. When there is substantial overlap, the intensity of the two radiations is preferably carefully controlled so as to activate the photoswitchable photoinitiator molecule without activating the second form thereof. Second, it can permit deeper penetration of the volume or layer of the composition as the conversion of the photoswitchable photoinitiator to the second form thereof has the effect of "bleaching" the photoswitchable photoinitiator molecule or making it transparent with respect to the second wavelength radiation.

Development of photohardenable compositions in accordance with the invention is conducted in an otherwise known or conventional manner, e.g., a solvent for the monomer may be used to remove the photohardenable composition in the unexposed areas. The monomers used herein most typically are known in the art as are their solvents.

Generally, photoswitchable photoinitiators useful in photohardenable compositions in accordance with the invention can absorb at about 300 to 450 nm. Depending upon the extinction coefficient for the particular photoswitchable photoinitiator, the conversion to the second form can be induced by exposure to any source which emits in this range, e.g., lasers, light emitting diodes, mercury lamps. Filters may be used to limit the output wavelengths. A non-limiting example of filtered light includes filtered emission from a mercury arc lamp, etc.

The second form of the photoswitchable photoinitiator will preferably absorb in a range of about 450 to 1000 nm and 450 to 850 most typically. This form can be activated by the second excitation light to produce free radicals directly or to produce excitons which undergo electron transfer, hydrogen abstraction (optionally via electron, proton, or energy transfer to a coinitiator(s) in aspects of the invention including one or more coinitiator) by exposure to any second wavelength within this range. For the second excitation, exposures may be accomplished using a laser source, an LED or LED array, the filtered emission from an arc lamp, or other suitable source with emission within the desired wavelength range. argon ion, He—Ne, laser diodes, krypton, frequency-multiplied Nd—YAG etc. Other light sources may be used, optionally with filters to limit output wavelengths, e.g., light emitting diodes, incandescent lamps, halogen lamps, mercury lamps, arc lamps, etc.

A photohardenable composition in accordance with the present invention may also be useful in forming three-dimensional objects by the x, y, z volumetric methods described in U.S. Pat. Nos. 4,041,476, 4,078,229, 4,238,840, 4,466,080, 4,471,470, and 4,333,165 to Swainson can be used. These patents disclose concepts relating to forming a three-dimensional figure in situ in a medium by causing two dissimilar radiation beams to intersect in the medium. In the described process, the x, y and z axes are scanned within a volume of a photohardenable material.

Information that may be useful in connection with the present invention in addition to the cited patents of Neckers, and Swainson includes International Patent Application No. PCT/US2021/035791 of Quadratic 3D, Inc. filed Jun. 3, 2021 for "Volumetric Three-Dimensional Printing Methods Including A Light Sheet And Systems" and U.S. Pat. No. 10,843,410 of Lippert, et al. for "System And Method For A Three-Dimensional Optical Switch Display (OSD) Device", each of the foregoing and other references cited herein being hereby incorporated herein by reference in its entirety.

The sensitivity of the photoswitchable photoinitiator molecule and the second form thereof to different radiation wavelengths permits the compositions of the present invention to be used in the Swainson methods.

Benzospiropyrans are prepared routinely from the corresponding salicylaldehydes and indolines in basic ethanol solution as shown in Equation 2. See E. Berman; R. E. Fox; F. D. Thomson; J. Am. Chem. Soc., 1959, 81, 5605. Iodinated compounds can be preferred.

Equation 2

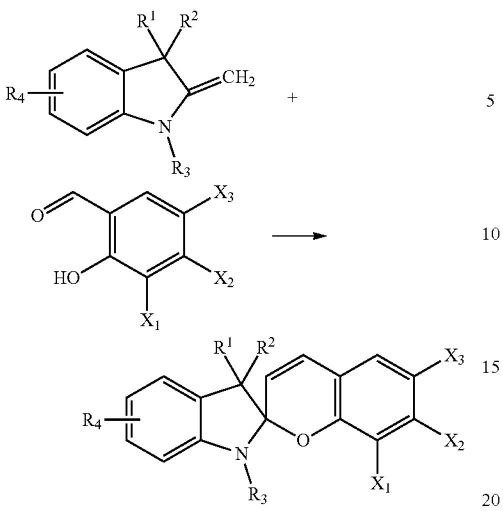

EXAMPLES

The examples provided herein are provided as examples and not limitations, wherein a number of modifications of the exemplified compositions and processes are contemplated and within the scope of the present invention.

Example 1

Example of Procedure for Preparation of an Example of a Photoswitchable Photoinitiator represented by formula (III) by the following reaction:

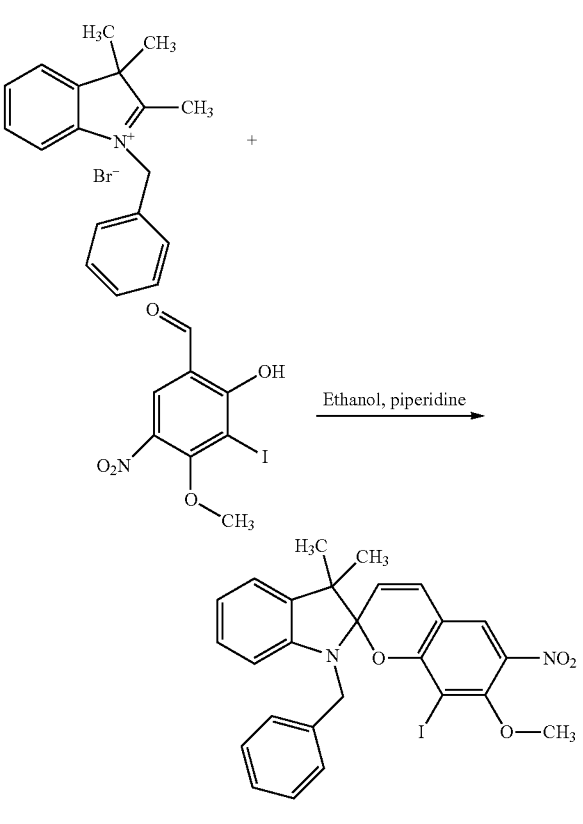

A solution of 207 mg of 2-hydroxy-3-iodo-4-methoxy-5-nitrobenzaldehyde*, 210 mg of 1-benzyl-3,3,2-trimethylindolenium bromide, and 50 microliters (μL) of piperidine in 5 mL of ethanol is heated to reflux for 3 hours. The solvent is removed under reduced pressure, and the crude product is purified by column chromatography (silica, basic) using dichloromethane as an eluent to give 150 mg of 1'-benzyl-3,3'-dimethyl-8-iodo-7 methoxy-6-nitrobenzospiropyran.

*Procedure for Preparation of 2-hydroxy-3-iodo-4-methoxy-5-nitrobenzaldehyde.

To a stirred solution of 2.0 g (10.2 mmol) (1.52 mmol) of 4-methoxy-5-nitrosalicylaldehyde and 2.58 g (10.2 mmol) of iodine in 60 ml of carbon tetrachloride, 4.8 g (11.2) mmol) of (bistrifluoroacetoxyl) iodobenzene is added slowly and then the reaction mixture is stirred for 15 hrs. at RT. To this reaction mixture, 60 ml of hexanes is added and then the formed solid is collected by filtration, is washed with hexanes, dilute HCl, water, and is dried to produce 2.1 grams of 2-hydroxy-3-iodo-4-methoxy-5-nitrobenzaldehyde.

The procedure of this Example generally follows that disclosed in Lee et al., "Two-Photon Radical-Photoinitiator System Based on Iodinated Benzospiropyrans", Chem. Mater. 1991, 3, 858-864, for preparing 1'-benzyl-3,3'-dimethyl-8-iodo-7 methoxy-6-nitrobenzospiropyran (identified as compound 9 or BIMNBSP in the paper).

Example 2

Example of Procedure for Preparation of an Example of a Photoswitchable Photoinitiator represented by formula (IV) by the following reaction:

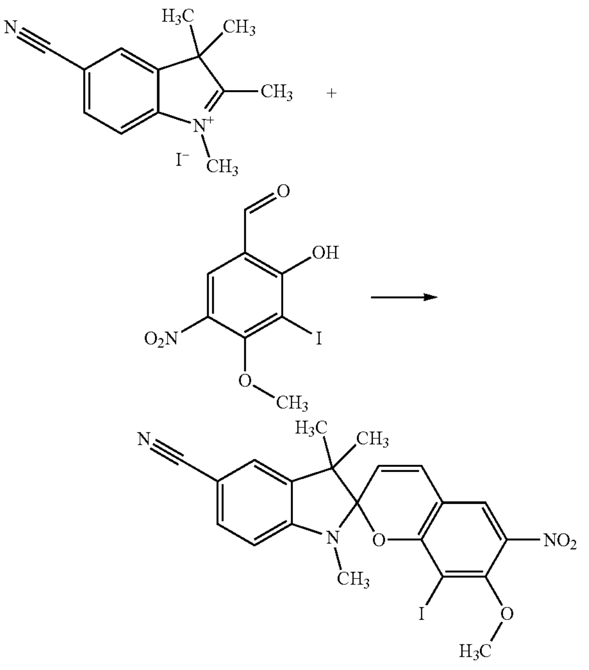

A solution of 100 mg of 5 cyano 1,2,3,3 tetramethyl 3H indolium iodide, 100 mg of 2-hydroxy-3-iodo-4-methoxy-5 nitrobenaldehyde and 0.05 mL of triethanolamine is heated to 80 degrees for four hours under nitrogen atmosphere in a sealed tube. The resulting solution is extracted using 50 mL of water and 50 mL of dichloromethane, the dichloromethane is evaporated and the resulting solid is purified on basic silica using dichloromethane as eluent to yield the product.

Example 3

Example of Procedure for Preparation of an Example of A Photohardenable Composition Including Photoswitchable Photoinitiator Represented by Formula (III) and a Coinitiator To a 40 mL glass scintillation vial, 1.20 g Crystasense HP-5 thixotrope (Croda) and 5.0 g N,N-dimethylacrylamide (99.5%, Sigma Aldrich) are added. The vial is sealed and placed in a 105° C. heating block for 10 min to melt the thixotrope. The vial is mixed in a speedmixer (model DAC 150.1 FVZ-K, Flacktek) for 1 min at 3100 rpm. The thixotrope solution is poured into a plastic speedmixer jar (max-100, Flacktek). 5.0 g stock solution of photoswitchable photoinitiator (20.0 mg 1'-benzyl-3',3'-dimethyl-8-iodo-7-methoxy-6-nitrobenzospiropyran dissolved in 20.0 g N,N-dimethylacrylamide) is added to the jar. 200 mg butyryl choline butyltriphenylborate is weighed out and added to the jar. The jar is mixed for 1 min at 2200 rpm. 25.0 g GENOMER 4247 urethane methacrylate (Rahn) is added to the jar. The jar is mixed for 1 min at 3100 rpm. 65.0 g additional GENOMER 4247 is added to the jar. The jar is mixed for 1 min at 3100 rpm. The photohardenable composition is transferred by plastic syringe to cuvettes for printing. As necessary, the cuvettes are centrifuged to remove bubbles and cleaned with methanol to remove smudges.

Example 4

Example of Procedure for Printing an Object

A cuvette of photohardenable composition (e.g., as described in Example 3) is placed in a plastic holder on a motorized stage. Red light (638 nm CW diode laser, 20 W operating power) is used to illuminate a digital micromirror device (Texas Instruments) to form a pattern which is projected into the cuvette along the z axis to produce a pattern of approximately 5 W/$cm^2$ of 638 nm light. Violet light (405 nm CW diode laser, 100 mW operating power) is used to form a light sheet that passes through the cuvette orthogonally to the projected pattern to illuminate a single x-y plane of nominal 100 microns thickness to produce an intensity of approximately 1.15 W/$cm^2$. The stage is advanced in 6 micron increments at intervals of 380 ms, with the violet light forming a light sheet and the red light pattern changing at each advancement corresponding to computer generated slices of a three-dimensional object. In regions where there is simultaneous or nearly simultaneous exposure to both red and violet light, the photohardenable composition is hardened. In this manner, a three-dimensional solid object is formed without displacement (e.g., sinking or drifting) and without need for support structures or attachment to a build platform due to the high zero shear viscosity or yield stress of the non-Newtonian photohardenable composition.

Light sheets can be constructed by means known in the art including, for example, but not limited to, techniques including a laser and a Powell lens, galvanometer, or polygon scanning mirror.

Optionally, a method described herein can further include use of a third wavelength to force the reverse reaction of the second form of the photoswitchable photoinitiator back to the original/starting form to help avoid hardening of unwanted areas.

As used herein first wavelength, second wavelength, and third wavelength each can refer to a range of wavelengths.

Embodiments of inventions described herein including the following:

Embodiment 1: A photohardenable composition comprising a photohardenable component, a photoswitchable photoinitiator, and further comprising a coinitiator and/or a sensitizer, wherein the photoswitchable photoinitiator is activatable by exposure to light having a first wavelength and light having a second wavelength to induce a crosslinking or polymerization reaction in the photohardenable component, wherein the first and second wavelengths are different, and wherein the photohardenable composition displays non-Newtonian rheological behavior.

Embodiment 2: A photohardenable composition comprising a photohardenable component, a photoswitchable photoinitiator, and further comprising a coinitiator and/or sensitizer, wherein exposure of the photoswitchable photoinitiator to light having a first wavelength generates a second form of the photoswitchable photoinitiator, which second form, upon exposure to light having a second wavelength, generates an excited species that can induce a crosslinking or polymerization reaction in the photohardenable component, through interaction with one or more coinitiators, to at least partially harden the photohardenable composition, wherein the first and second wavelengths are different, wherein the photohardenable composition displays non-Newtonian rheological behavior.

Embodiment 3: A photohardenable composition comprising a photohardenable component and a photoswitchable photoinitiator, wherein exposure of the photoswitchable photoinitiator to light having a first wavelength generates a second form of the photoswitchable photoinitiator, which second form, upon exposure to light having a second wavelength, generates a non-emissive or substantially non-emissive excited species that can induce a crosslinking or polymerization reaction in the photohardenable component, to at least partially harden the photohardenable composition, wherein the first and second wavelengths are different, wherein the photohardenable composition displays non-Newtonian rheological behavior.

Embodiment 4: A photohardenable composition comprising a photohardenable component and a photoswitchable photoinitiator, wherein the photoswitchable photoinitiator is activatable by exposure to light having a first wavelength and light having a second wavelength to induce hardening of the photohardenable component, wherein the first and second wavelengths are different, wherein the photohardenable composition displays non-Newtonian rheological behavior, and wherein the photoswitchable photoinitiator is represented by formula (I):

(I)

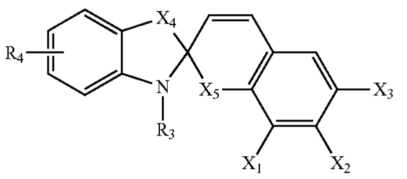

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, it is of the formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

Embodiment 5: A photohardenable composition comprising a photohardenable component and a photoswitchable photoinitiator, wherein the photoswitchable photoinitiator is activatable by exposure to light having a first wavelength and light having a second wavelength to induce hardening of the photohardenable component, wherein the first and second wavelengths are different, wherein the photohardenable composition displays non-Newtonian rheological behavior, and wherein the photoswitchable photoinitiator is represented by formula (II):

(II)

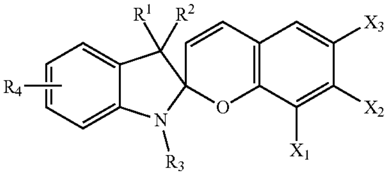

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

Embodiment 6: The photohardenable composition of embodiment 3, 4, or 5 further comprising one or more coinitiators and/or sensitizers.

Embodiment 7: The photohardenable composition of any one of embodiments 1-5 further comprising a synergist.

Embodiment 8: The photohardenable composition of embodiment 6 further comprising a synergist.

Embodiment 9: The photohardenable composition of any one of embodiments 1-5 wherein the non-Newtonian rheological behavior comprises pseudoplastic behavior.

Embodiment 10: The photohardenable composition of any one of embodiments 1-5 wherein the non-Newtonian rheological behavior comprises Bingham plastic behavior.

Embodiment 11: The photohardenable composition of embodiment 1 or embodiment 2 wherein the coinitiator comprises a tertiary amine or a borate salt.

Embodiment 12: The photohardenable composition of embodiment 6 wherein the coinitiator comprises a tertiary amine or a borate salt.

Embodiment 13: The photohardenable composition of embodiment 1 or embodiment 2 wherein the coinitiator comprises a combination of a tertiary amine and an iodonium salt.

Embodiment 14: The photohardenable composition of embodiment 6 wherein the coinitiator comprises a combination of a tertiary amine and an iodonium salt.

Embodiment 15: The photohardenable composition of embodiment 1 or 2 wherein the coinitiator comprises a combination of a borate salt and an iodonium salt.

Embodiment 16: The photohardenable composition of embodiment 6 wherein the coinitiator comprises a combination of a borate salt and an iodonium salt.

Embodiment 17: The photohardenable composition of any one of embodiments 1-5 wherein the composition further includes a sensitizer.

Embodiment 18: The photohardenable composition of embodiment 9 wherein the sensitizer comprises isopropylthioxanthone or Esacure 3644.

Embodiment 19: The photohardenable composition of any one of embodiments 1-5 wherein the composition further includes a thermally activated radical initiator.

Embodiment 20: The photohardenable composition of embodiment 1 or 2 wherein the photohardenable composition comprises from about 10 to about 100 weight percent of the photohardenable component, from 0.001 to about 0.5 weight percent of the photoswitchable photoinitiator, from about 0.001 to about 10 weight percent of the coinitiator.

Embodiment 21: The photohardenable composition of any one of embodiments 1-5 wherein the photohardenable component displays non-Newtonian rheological behavior.

Embodiment 22: The photohardenable composition of embodiment 13 wherein the non-Newtonian rheological behavior comprises pseudoplastic behavior.

Embodiment 23: The photohardenable composition of embodiment 13 wherein the non-Newtonian rheological behavior comprises Bingham plastic behavior.

Embodiment 24: The photohardenable composition of any one of embodiments 1-5 wherein non-Newtonian rheological behavior is imparted to the composition by further including an effective amount of one or more reactive components in the photohardenable component.

Embodiment 25: The photohardenable composition of any one of embodiments 1-5 wherein non-Newtonian rheological behavior is imparted to the composition by further including an effective amount of a non-reactive thixotrope additive and/or rheology modifier additive in the composition.

Embodiment 26: The photohardenable composition of any one of embodiments 1-5 wherein exposure of the photoswitchable photoinitiator to only light of the first wavelength or only light of the second wavelength does not photoharden the photohardenable component.

Embodiment 27: The photohardenable composition of any one of embodiments 1-3 wherein the photoswitchable photoinitiator comprises a benzospiropyran represented by the formula (I):

(I)

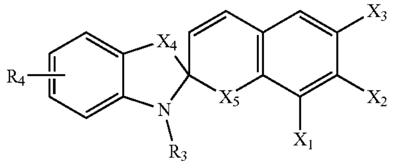

wherein $X_4$ represents the atoms necessary to complete an indoline, 1,3-thiazazoloidine, 1,3-oxazalidine, pyrrolidine, 1,3-thiazine, 1,4-thiazine, 1,3-oxazine, piperidine, phenanthridine, acridine, quinoline, benzodithiole, benzoxathiazole, 2H-chromene, xanthene or dithiole ring wherein, when a methylene group is present in said ring, it is of the formula $CR^1R^2$ wherein $R^1$ and $R^2$ are defined below, $X_5$ represents O, S, Se or $CR^1R^2$, wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

Embodiment 28: The photohardenable composition of embodiment 27 wherein at least one of $X_1$, $X_2$, and $X_3$ is iodo.

Embodiment 29: The photohardenable composition of any one of embodiments 1-3 wherein the photoswitchable photoinitiator comprises a benzospiropyran represented by the formula (II):

(II)

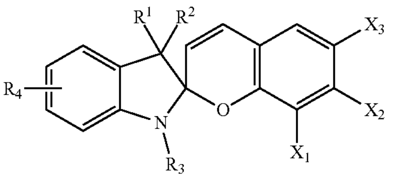

wherein $R^1$ and $R^2$ are the same or different and are selected from alkyl, arylalkyl, aryl, and hydrogen, $R^3$ represents alkyl, aralkyl, alkylamino, arylamino, or amido; $X_1$ and $X_3$ are the same or different and represent hydrogen, iodo, nitro, cyano, bromo, chloro, fluoro or amino provided at least one of the two groups $X_1$ and $X_3$ is not hydrogen; and $X_2$ represents hydrogen, alkoxy, a carboxy ester, or amino; and $R^4$ is hydrogen, fluoro, chloro, bromo, iodo, nitro, alkoxy, carboxy ester, aryl, amino, or cyano or $R^4$ represents the atoms necessary to complete a condensed benzene ring.

Embodiment 30: The photohardenable composition of embodiment 29 wherein at least one of $X_1$, $X_2$, and $X_3$ is iodo.

Embodiment 31: The photohardenable composition of embodiment 29 wherein $X_1$ is iodo, $X_2$ is an alkoxy group, $X_3$ is a nitro group, and $R^4$ is hydrogen or a cyano group.

Embodiment 32: The photohardenable composition of any one of embodiments 1-5 wherein the photoswitchable photoinitiator comprises a molecule represented by the formula (III):

(III)

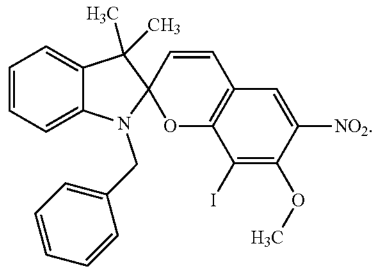

Embodiment 33: The photohardenable composition of any one of embodiments 1-5 wherein the photoswitchable photoinitiator comprises a molecule represented by the formula (IV):

(IV)

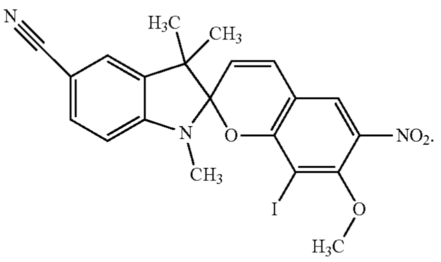 [SMILES: COc1c([N+](=O)[O-])cc2c(c1I)OC1(C=C2)N(C)c2ccc(C#N)cc2C1(C)C]

Embodiment 34: The photohardenable composition of embodiment 1 or 2 wherein the photoswitchable photoinitiator comprises a spirolactam rhodamine or derivatives thereof.

Embodiment 35: The photohardenable composition of any one of embodiments 1-5 wherein the photohardenable composition has a steady shear viscosity of about 30,000 centipoise or less.

Embodiment 36: The photohardenable composition of any one of embodiments 1-5 wherein the photohardenable composition has a steady shear viscosity of about 10,000 centipoise or less.

Embodiment 37: The photohardenable composition of any one of embodiments 1-5 wherein the photohardenable composition has a steady shear viscosity of about 1,000 centipoise or less.

Embodiment 38: The photohardenable composition of any one of embodiments 1-5 further comprising a solvent.

Embodiment 39: The photohardenable composition of any one of embodiments 1-5 further comprising a filler.

Embodiment 40: The photohardenable composition of any one of embodiments 1-5 wherein the photohardenable component comprises a urethane acrylate or a urethane methacrylate.

Embodiment 41: The photohardenable composition any one of embodiments 3, 4, and 5 wherein the photohardenable composition comprises from about 10 to about 100 weight percent of the photohardenable component and from 0.001 to about 0.5 weight percent of the photoswitchable photoinitiator.

Embodiment 42: The photohardenable composition of any one of embodiments 1-5 wherein inducing hardening of the photohardenable component comprises a crosslinking or polymerization reaction in the photohardenable component.

Embodiment 43: A method of printing an object comprising: (a) providing a volume including the photohardenable composition of any one of embodiments 1-42, (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed.

Embodiment 44: The method of embodiment 43 wherein the photoswitchable photoinitiator comprises the molecule represented by the formula (III):

(III)

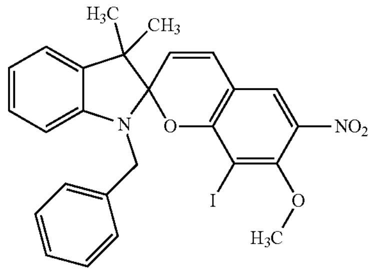

and wherein the first wavelength is in a range from about 400 to about 410 nm (inclusive) and the second wavelength is in a range from about 450 to about 700 nm (inclusive).

Embodiment 45: The method of embodiment 43 wherein the photoswitchable photoinitiator is represented by formula (IV):

(IV)

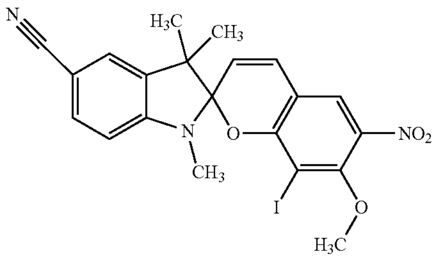

and wherein the first wavelength is in a range from about 400 to about 410 nm (inclusive) and the second wavelength is in a range from about 450 to about 700 nm (inclusive).

Embodiment 46: The method of embodiment 43, 44, or 45 wherein the volume of the photohardenable liquid is included within a container wherein at least one or more portions of the container are optically transparent so that the photohardenable composition is accessible by light.

Embodiment 47: The method of embodiment 43, 44, or 45 wherein the power density of the first wavelength light at the one or more selected locations is in a range from about 0.01 to about 100,000 W/cm$^2$ (inclusive) and the power density of the second wavelength light at the one or more selected locations is in a range from about 0.01 to about 100,000 W/cm$^2$ (inclusive).

Embodiment 48: The method of embodiment 43, 44, or 45 wherein the exposure energy of the first wavelength light at the one or more selected locations is in a range from about 0.001 to about 1,000 mJ/cm$^2$ (inclusive) and the exposure energy of the second wavelength light at the one or more selected locations is in a range from about 0.01 to about 100,000 mJ/cm$^2$ (inclusive).

Embodiment 49: A method of forming an object comprising: (a) providing a volume including a photohardenable composition; (b) simultaneously or sequentially irradiating one or more selected locations within the volume of the photohardenable composition with light having the first wavelength and light having the second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation; and (c) optionally repeating step b, irradiating the photohardenable composition at one or more of the same or different locations in the volume until the object is partially or fully formed, wherein the photohardenable composition comprises a photohardenable component and a photoswitchable photoinitiator represented by formula (II):

(II)

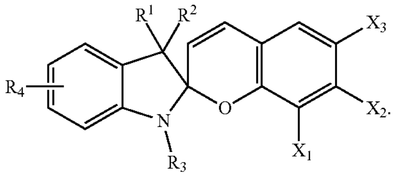

wherein $X_1$-$X_3$ and $R^1$-$R^4$ are defined as in embodiment 27 and at least one of $X_1$, $X_2$, and $X_3$ is iodo, and optionally a coinitiator and/or a sensitizer, wherein the photoswitchable photoinitiator is activatable by exposure to light having a first wavelength and light having a second wavelength to induce a crosslinking or polymerization reaction in the photohardenable component, wherein the first and second wavelengths are different, and wherein the first wavelength is in a range from about 400 to about 410 nm (inclusive) and the second wavelength is in a range from about 450 to about 700 nm (inclusive).

Embodiment 50: The method of embodiment 49 wherein the photohardenable composition comprises a photohardenable component and a photoswitchable photoinitiator represented by formula (II):

(II)

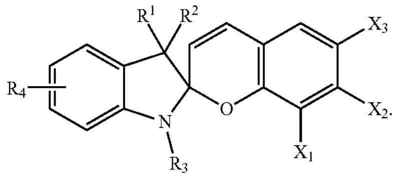

wherein $X_1$-$X_3$ and $R^1$-$R^4$ are defined as in embodiment 27 and wherein $X_1$ is iodo, $X_2$ is an alkoxy group, $X_3$ is a nitro group, and $R^4$ is a hydrogen or a cyano.

Embodiment 51: The method of embodiment 49 wherein the photoswitchable photoinitiator comprises the molecule represented by the formula (III):

(III)

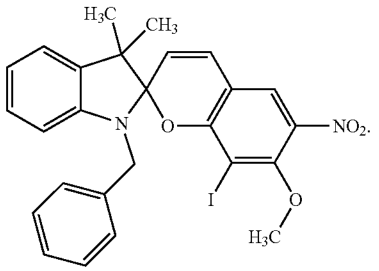

Embodiment 52: The method of embodiment 49 wherein the photoswitchable photoinitiator is represented by formula (IV):

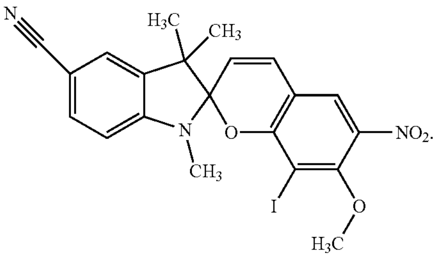

Embodiment 53: The method of embodiment 49 wherein the photohardenable composition further includes one or more coinitiators and/or sensitizers.

Embodiment 54: The method of embodiment 49 wherein the photohardenable composition further includes one or more synergists.

Embodiment 55: The method of embodiment 53 wherein the photohardenable composition further includes one or more synergists.

Embodiment 56: The method of embodiment 43 or 49 wherein the volume of the photohardenable liquid is included within a container wherein at least one or more portions of the container are optically transparent so that the photohardenable composition is accessible by light.

Embodiment 57: The method of embodiment 43 or 49 wherein the power density of the first wavelength light at the one or more selected locations is in a range from about 0.01 to about 100,000 W/$cm^2$ (inclusive) and the power density of the second wavelength light at the one or more selected locations is in a range from about 0.01 to about 100,000 W/$cm^2$ (inclusive).

Embodiment 58: The method of embodiment 43 or 49 wherein the exposure energy of the first wavelength light at the one or more selected locations is in a range from about 0.001 to about 1,000 mJ/$cm^2$ (inclusive) and the exposure energy of the second wavelength light at the one or more selected locations is in a range from about 0.01 to about 100,000 mJ/$cm^2$ (inclusive).

Embodiment 59: The method of any one of embodiments 43-58 wherein the amount of time during which one or more selected locations within the volume are simultaneously or sequentially exposed to the first wavelength light and the second wavelength light to induce hardening of the photohardenable composition at the one or more selected locations is insufficient to cause hardening of the photohardenable composition when only one of the first and second wavelengths is present.

Embodiment 60: The method of any one of embodiments 43-59 wherein light of the first and light of the second wavelengths are projected into the volume as separate optical projections.

Embodiment 61: The method of embodiment 60 wherein the projection of light of the first wavelength comprises a light sheet.

Embodiment 62: The method of embodiment 60 or 61 wherein the projection of light of the first wavelength is orthogonal to the projection of the light of the second wavelength.

Embodiment 63: The method of embodiment 61 wherein the generation of the light sheet includes use of system including a laser and a Powell lens, galvanometer, or polygon scanning mirror.

Embodiment 64: The method of any one of embodiments 49-51 wherein the photohardenable composition displays non-Newtonian rheological behavior.

Embodiment 65: The photohardenable composition of embodiment 1 wherein the photoswitchable photoinitiator comprises a photochromic compound which undergoes reversible intramolecular transformations forming its merocyanine isomer (MC) by irradiation.

Methods and systems useful with the photohardenable compositions and methods of the present invention include those described in U.S. Patent Application No. 63/231,182 of Quadratic 3D, Inc. filed Aug. 9, 2021 for "Methods And Systems For Forming An Object In A Volume Of A Photohardenable Composition".

In methods described herein, the first wavelength and second wavelength are preferably generated by different light sources or optical projection systems.

Examples of light sources and optical projection systems that can be used to produce the first wavelength and second wavelength include, by way of example, but not limited to, those described in International Patent Application No. PCT/US2021/035791 of Quadratic 3D, Inc. filed Jun. 3, 2021 for "Volumetric Three-Dimensional Printing Methods Including A Light Sheet And Systems".

A method of the present invention preferably includes providing a volume of a photohardenable composition described herein that is included within a container wherein at least a portion of the container is optically transparent so that the photohardenable composition is accessible by excitation light. Optionally, the entire container is optically transparent.

Optically transparent portions of a container can be constructed from a material comprising, for example, but not limited to, glass, quartz, fluoropolymers (e.g., Teflon FEP, Teflon AF, Teflon PFA), cyclic olefin copolymers, polymethyl methacrylate (PMMA), polynorbornene, sapphire, or transparent ceramic.

Examples of container shapes include, but are not limited to, a cylindrical container having a circular or oval cross-section, a container having straight sides with a polygonal cross-section or a rectangular or square cross-section.

Preferably the optically transparent portion(s) of the container is (are) also optically flat.

Optionally, one or more filters are added to at least a surface of any optically transparent portions of the container to block undesired light, e.g., room light, to prevent unintentional curing.

Optionally the photohardenable composition is degassed, purged or sparged with an inert gas before or after being introduced into the container. Optionally the photohardenable composition is maintained under inert conditions, e.g., under an inert atmosphere, during printing. This can prevent introduction of oxygen into the container while the object is being printed or formed.

In the method described herein, the container may be rotated to provide additional angles of illumination or projection of excitation light into the volume of photohardenable composition contained therein. This can be of assistance in patterning object volumes or surfaces more accurately or it can be used as a means of providing multiple exposure of a given feature from different angles.

In the method described herein, the container may be stationary while a beam or optical projection of excitation light is being directed into the photohardenable composition.

The methods disclosed herein can also include the use commercially available optical projection and filtering techniques or systems that employ two or more optical projection methods at once.

Before printing, a digital file of the object to be printed is obtained. If the digital file is not of a format that can be used to print the object, the digital file is then converted to a format that can be used to print the object. An example of a typical format that can be used for printing includes, but is not limited to, an STL file. Typically, the STL file is then sliced into two-dimensional layers with use of three-dimensional slicer software and converted into G-Code or a set of machine commands, which facilitates building the object. See B. Redwood, et al., "The 3D Printing Handbook-Technologies, designs applications", 3D HUBS B.V. 2018.

Examples of sources of the excitation light source for use in the methods described herein include laser diodes, such as those available commercially, light emitting diodes, DMD projection systems, micro-LED arrays, vertical cavity lasers (VCLs). In some embodiments, the excitation radiation source (e.g., the light source) is a light-emitting diode (LED).

The excitation light can be directed into the volume of photohardenable composition in a continuous or intermittent manner. Intermittent excitation can include random on and off application of light or periodic application of light. Examples of periodic application of light includes pulsing. Excitation can alternatively be applied as a combination of both continuous excitation light and intermittent light, including, for example, the application of intermittent excitation light that is preceded or followed by irradiation with continuous light.

Other information concerning optical systems that may useful in connection with the various aspects of the present inventions includes Texas Instruments Application Report DLPA022-July 2010 entitled "DLP™ System Optics"; Texas Instruments "TI DL$^R$ Technology for 3D Printing-Design scalable high-speed stereolithography [sic] systems using TI DLP technology" 2016; Texas Instruments "DLP6500 0.65 1018p MVSP Type A DMD", DLP6500, DLPS040A-October 2014—Revised October 2016; and Y-H Lee, et al., "Fabrication of Periodic 3D Nanostructuration for Optical Surfaces by Holographic Two-Photon-Polymerization", Int'l Journal of Information and Electronics Engineering, Vol 6, No. 3, May 2016, each of the foregoing being hereby incorporated herein by reference in its entirety.

As used herein, the singular forms "a", "an" and "the" include plural unless the context clearly dictates otherwise. Thus, for example, reference to an emissive material includes reference to one or more of such materials.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A photohardenable composition for use in forming an object in a volume of the photohardenable composition, the photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, wherein the photohardenable composition displays non-Newtonian rheological behavior for forming the object in the photohardenable composition at a fixed position or with minimal displacement in the photohardenable composition during formation, wherein non-Newtonian rheological behavior is imparted to the photohardenable composition by further including an effective amount of a non-reactive thixotrope additive in the photohardenable composition.

2. The photohardenable composition of claim 1 wherein exposure of the photoswitchable photoinitiator to light having the first wavelength generates a second form of the photoswitchable photoinitiator, which second form, upon exposure to light having the second wavelength, generates an excited species that can induce a crosslinking or polymerization reaction in the photohardenable component, to at least partially harden the photohardenable composition.

3. The photohardenable composition of claim 1 wherein exposure of the photoswitchable photoinitiator to light having the first wavelength generates a second form of the photoswitchable photoinitiator, which second form, upon exposure to light having the second wavelength, generates a non-emissive or substantially non-emissive excited species that can induce hardening of the photohardenable component.

4. The photohardenable composition of claim 1 further comprising one or more coinitiators and/or one or more sensitizers.

5. The photohardenable composition of claim 1 wherein the non-Newtonian rheological behavior comprises pseudoplastic behavior.

6. The photohardenable composition of claim 4 wherein the non-Newtonian rheological behavior comprises pseudoplastic behavior.

7. The photohardenable composition of claim 4 wherein the non-Newtonian rheological behavior comprises Bingham plastic behavior.

8. The photohardenable composition of claim 4 wherein the non-Newtonian rheological behavior comprises Bingham pseudoplastic behavior.

9. The photohardenable composition of claim 4 wherein the one or more coinitiators comprise a tertiary amine or a borate salt.

10. The photohardenable composition of claim 4 wherein the photohardenable component comprises a urethane acrylate or a urethane methacrylate.

11. The photohardenable composition of claim 4 wherein the one or more coinitiators comprise a tertiary amine and an iodonium salt.

12. The photohardenable composition of claim 1 wherein the non-Newtonian rheological behavior comprises Bingham plastic behavior.

13. The photohardenable composition of claim 1 wherein the non-Newtonian rheological behavior comprises Bingham pseudoplastic behavior.

14. The photohardenable composition of claim 1 wherein the photohardenable component comprises a urethane acrylate or a urethane methacrylate.

15. A method of printing an object comprising:

(a) providing a volume including a photohardenable composition comprising a photohardenable component and a photoswitchable photoinitiator, wherein the photoswitchable photoinitiator is activatable by exposure to light having a first wavelength and light having a second wavelength to induce a crosslinking or polymerization reaction in the photohardenable component, wherein the first and second wavelengths are different, wherein the photopolymerizable composition displays non-Newtonian rheological behavior, (b) simultaneously or sequentially irradiating one or more selected locations within the volume of the photohardenable composition with light having a first wavelength and light having a second wavelength, wherein light having the first wavelength and light having the second wavelength activate the photoswitchable photoinitiator at the one or more selected locations and at least partially harden the photohardenable composition at the one or more selected locations within the volume to at least partially form the object, wherein the object at least partially formed in the photohardenable composition remains at a fixed position or is minimally displaced in the unhardened photohardenable composition during formation, wherein the first and second wavelengths are different; and (c) optionally repeating step b, irradiating the photohardenable composition at one or more of the same or different locations in the volume until the object is partially or fully formed.

16. The method of claim 15 wherein the photopolymerizable composition further comprises one or more coinitiators and/or one or more sensitizers.

17. The method of claim 15 wherein the first wavelength is in a range from about 300 to about 450 nm (inclusive) and the second wavelength is in a range from about 450 to about 1000 nm (inclusive), preferably from about 450 nm to about 850 nm (inclusive).

18. The method of claim 15 wherein the amount of time during which one or more selected locations within the volume are simultaneously or sequentially exposed to the first wavelength light and the second wavelength light to induce hardening of the photohardenable composition at the one or more selected locations is insufficient to cause hardening of the photohardenable composition when only one of the first and second wavelengths is present.

* * * * *